United States Patent
Jevons

(10) Patent No.: US 9,638,043 B2
(45) Date of Patent: May 2, 2017

(54) METHOD OF MANUFACTURING A COMPOSITE MATERIAL INCLUDING A THERMOPLASTIC COATED REINFORCING ELEMENT

(71) Applicant: ROLLS-ROYCE PLC, London (GB)

(72) Inventor: Matthew Paul Jevons, Derby (GB)

(73) Assignee: ROLLS-ROYCE plc, London (GB)

( * ) Notice: Subject to any disclaimer, the term of this patent is extended or adjusted under 35 U.S.C. 154(b) by 306 days.

(21) Appl. No.: 14/230,546

(22) Filed: Mar. 31, 2014

(65) Prior Publication Data

US 2014/0308136 A1    Oct. 16, 2014

(30) Foreign Application Priority Data

Apr. 10, 2013    (GB) .................................. 1306481.1

(51) Int. Cl.
*B05D 3/02*     (2006.01)
*F01D 5/14*     (2006.01)
(Continued)

(52) U.S. Cl.
CPC .............. *F01D 5/147* (2013.01); *B05D 1/02* (2013.01); *B05D 1/18* (2013.01); *B29C 70/24* (2013.01); *B29C 70/40* (2013.01); *B29C 70/887* (2013.01); *B29K 2101/12* (2013.01); *B29L 2031/08* (2013.01); *B29L 2031/7504* (2013.01); *Y10T 428/24331* (2015.01)

(58) Field of Classification Search
CPC .. B05D 1/02; B05D 1/18; B29C 70/40; B29C 70/887; B29C 70/24; F01D 5/147; B29L 2031/7504; B29L 2031/08; B29K 2101/12; Y10T 428/24331
See application file for complete search history.

(56) References Cited

U.S. PATENT DOCUMENTS

| | | | | |
|---|---|---|---|---|
| 6,106,646 A | * | 8/2000 | Fairbanks | ........... B29C 66/8322 156/253 |
| 2003/0017053 A1 | * | 1/2003 | Baldwin | ................. B29C 70/24 416/229 A |

(Continued)

FOREIGN PATENT DOCUMENTS

| EP | 2 415 585 A1 | 2/2012 |
|---|---|---|
| EP | 2 505 342 A1 | 10/2012 |

(Continued)

OTHER PUBLICATIONS

English translation of the abstract of KR 20130004967.*

(Continued)

*Primary Examiner* — Robert S Walters, Jr.
(74) *Attorney, Agent, or Firm* — Oliff PLC

(57) ABSTRACT

A method of through-thickness reinforcing a laminated material is disclosed, in which a reinforcing element is coated with a thermoplastic layer. The reinforcing element is inserted into a base material, and a matrix material, such as a polymeric, is included in the base material. The combination is then cured, or heated, such that the thermoplastic layer and the matrix material diffuse into each other, thereby forming an interphase region around the reinforcing element. This interphase region helps to prevent cracks from propagating from the reinforcing element.

12 Claims, 5 Drawing Sheets

(51) Int. Cl.
*B05D 1/02* (2006.01)
*B05D 1/18* (2006.01)
*B29C 70/40* (2006.01)
*B29C 70/88* (2006.01)
*B29C 70/24* (2006.01)
B29L 31/00 (2006.01)
B29K 101/12 (2006.01)
B29L 31/08 (2006.01)

(56) References Cited

U.S. PATENT DOCUMENTS

2003/0203179 A1 10/2003 Hawkins et al.
2013/0082416 A1* 4/2013 Wakeman ............... B29C 33/14
264/259

FOREIGN PATENT DOCUMENTS

| KR | 20130004967 A * | 1/2013 |
| WO | WO 97/42419 A1 | 11/1997 |
| WO | WO 2008/115301 A2 | 9/2008 |

OTHER PUBLICATIONS

Alagirusamy et al."Technical Textile Yarns Industrial and Medical Applications" copyright 2010 (relevant section 5.8.1 provided).*
Sep. 19, 2014 Search Report issued in EP Application No. 14162745.
British Search Report issued in British Patent Application No. GB1306481.1 on Nov. 29, 2013.

* cited by examiner

METHOD OF MANUFACTURING A COMPOSITE MATERIAL INCLUDING A THERMOPLASTIC COATED REINFORCING ELEMENT

CROSS-REFERENCE TO RELATED APPLICATIONS

This application is based upon and claims the benefit of priority from British Patent Application Number 1306481.1 filed 10 Apr. 2013, the entire contents of which are incorporated by reference.

BACKGROUND OF THE INVENTION

1. Field of the Disclosure

This invention relates to a method of manufacturing a composite material. In particular, the invention relates to a method of manufacturing a composite material including at least one reinforcing element.

2. Description of the Related Art

Laminated composite materials, in which reinforcing fibres are held within a polymeric matrix, are extensively used in many engineering applications. Such materials can generally provide a higher strength and stiffness per unit weight than conventional metallic materials. This makes such composite materials advantageous for weight sensitive applications, such as those in the field of aerospace.

A known problem with laminated composite materials is their poor inter-laminar, or through-thickness, mechanical properties in comparison to the corresponding in-plane properties. Such low inter-laminar strength and fracture toughness can constrain the design of composite parts and may even limit the use of such materials for certain applications.

One solution to this problem is the use of a toughened matrix material. Such matrix materials are generally significantly more expensive than conventional matrix materials, often have poor high temperature properties and may still not provide a sufficient increase in fracture toughness.

An alternative solution to improving inter-laminar strength properties is the insertion of through-thickness fibres into the laminated material. Various techniques have been developed for the insertion of such reinforcing fibres.

One method for inserting through-thickness reinforcing fibres into the laminated material is stapling or z-pinning. These reinforcing fibres are generally fibrous in structure and may be formed with a 45° chamfer at the insertion end.

Through-thickness reinforcing fibres are intended to resist shear forces so as to improve the inter-laminar strength and fracture toughness. Without the presence of the through-thickness reinforcing fibres the composite may de-laminate when exposed to shear forces.

Although the presence of the through-thickness reinforcing fibres increases the intra-laminar strength of the composite material, their presence in the structure can introduce an altogether different weakness. Due to the shear forces to which they are subjected, the through-thickness reinforcing fibres can act as a crack initiation point in the laminated structure. From the insertion point in the composite material, such cracks tend to form in a direction perpendicular to the through-thickness direction of the reinforcing fibres.

The only known solution to this problem is to provide a larger number of reinforcing fibres for a given area or volume of composite material. Naturally, this increases the time and cost of manufacturing the composite material and, by extension, the resulting completed component. Furthermore, in itself this solution does not prevent cracks forming around the reinforcing fibres.

A further problem with the conventional z-pinning process is that the fibrous reinforcing pins can split or fracture during insertion as a result of the need to force the pins through the densely compacted fibre layers of the laminate and/or through the resin (for example where the fibres are pre-impregnated with resin). This can reduce the effectiveness of the presence of the reinforcing pins.

OBJECTS AND SUMMARY

According to an aspect, there is provided a method of manufacturing a through-thickness reinforced laminated material from a base material, the method comprising the steps of:
  providing the base material with a matrix material;
  coating at least one reinforcing element in a thermoplastic layer;
  through-thickness reinforcing the base material by inserting the at least one reinforcing element through the thickness of the base material; and
  after the preceding steps have been performed, curing the through-thickness reinforced base material to form the through-thickness reinforced laminated material such that an interphase zone is formed between the thermoplastic layer coating the at least one reinforcing element and the matrix material.

The interphase zone may be said to surround the reinforcing element. The formation of the interphase zone around the inserted reinforcing element may help to prevent cracks from propagating from the reinforcing element. The interphase zone may be referred to as a diffuse zone. The interphase (or diffuse) zone may comprise a mixture of the thermoplastic material that forms the coating of the reinforcing element and the matrix material. The proportion of thermoplastic material (originating from the coating of the reinforcing element) may gradually decrease through the interphase zone with increasing distance from the reinforcing element.

The steps of providing the base material with a matrix material; and through-thickness reinforcing the base material by inserting the at least one reinforcing element through the thickness of the base material may be performed in any order.

The step of providing the base material with a matrix material may be performed before inserting the at least one reinforcing element through the thickness of the base material, such that the at least one reinforcing element is inserted through the matrix material. Thus, the material into which the reinforcing element is inserted may be a composite material comprising fibres in a matrix material. Such a composite material may be formed, for example, by fibre layers that are pre-impregnated with the matrix material (a so-called "pre-pregged" composite material).

Thus according to an aspect, there is provided a method of manufacturing a through-thickness reinforced laminated material from a composite material (such as a laminated composite material) having fibres in a matrix material, the method comprising the steps of:
  coating at least one reinforcing element in a thermoplastic layer;
  through-thickness reinforcing the composite material by inserting the at least one reinforcing element through the thickness of the composite material; and curing the through-thickness reinforced composite material to form the through-thickness reinforced laminated material such that an interphase zone is formed between the thermoplastic layer coating the at least one reinforcing element and the matrix material.

According to such a method, the matrix material may be heated to a pre-determined temperature in order to trigger the curing process prior to the step of inserting the at least one reinforcing element, or may be kept below the curing temperature before the insertion.

However, the step of providing the base material with a matrix material may be performed after inserting the at least one reinforcing element through the thickness of the base material, such that the at least one reinforcing element is inserted into a dry fibre base material. For example, a resin transfer method may be used to provide the matrix material to the combination of the dry fibres with the reinforcing elements inserted therein.

Any suitable material may be used for the matrix material. For example, the matrix material may be a polymeric matrix material, such as an epoxy resin. The step of coating the at least one reinforcing element in the thermoplastic layer may comprise spraying the thermoplastic onto the reinforcing element or submerging the at least one reinforcing element in a bath of the thermoplastic material.

The step of coating the at least one reinforcing element in the thermoplastic layer may comprise over moulding the at least one reinforcing element in the thermoplastic material.

Purely by way of example, the reinforcing element(s) may be formed as a parallel sided cylinder or fibre. Alternatively, the reinforcing element may have other geometries such as, for example, a tapered or other shaped cylinder and/or may be fluted or ribbed.

The reinforcing element may have a chamfered tip (approximately 45°) which is intended to aid the fibres' insertion into the laminated material.

The reinforcing element may be formed from the group comprising boron, carbon, glass, silicon carbide, aluminium oxide, aluminium nitride, rigid phenolics, rigid polyimides, rigid epoxies, metal, nylon and composites of such materials.

The reinforcing element may be formed from a material which is compatible with the matrix material.

The step of through-thickness reinforcing the base material may include forming at least one hole through the thickness of the base material and then inserting the at least one reinforcing element into the at least one hole through the thickness of the base material.

The at least one hole may be formed by a needle inserted into the thickness of the base material.

The step of through-thickness reinforcing the base material may include inserting a plurality of reinforcing elements each of which is coated with a corresponding thermoplastic layer such that during the step of curing each thermoplastic layer forms a corresponding interphase zone surrounding the corresponding reinforcing element. A typical composite component which is to be formed with through-thickness reinforcement may comprise many thousands of through-thickness reinforcing fibres. Thus, inserting at least some of the reinforcing fibres simultaneously reduces the time, cost and/or practicality of the operation.

The step of through-thickness reinforcing the base material may include forming a plurality of holes (for example using a needle) through the thickness of the base material and inserting each of the plurality of reinforcing elements coated with the thermoplastic layer into one of the plurality of holes through the thickness of the base material. The plurality of holes may be formed simultaneously by a plurality of needles.

The or each reinforcing element may be rotated about its lengthwise axis as it is inserted into a respective hole in the laminated material.

According to an aspect, there is provided a laminated material formed from a through-thickness reinforced composite material which includes a matrix material and comprises at least one reinforcing element coated in a thermoplastic layer and inserted through the thickness of the composite material wherein the thermoplastic layer and the matrix material form an interphase zone which surrounds the at least one reinforcing element.

The cured matrix material may comprise a polymeric matrix material.

The laminated material may comprise a plurality of reinforcing elements each coated with a corresponding thermoplastic layer which are inserted through the thickness of the composite material where each thermoplastic layer forms a corresponding interphase zone which surrounds the corresponding reinforcing element.

According to an aspect, there is also provided a gas turbine engine component (such as, by way of example, a fan blade) formed using the through-thickness reinforced laminated material and/or method described above and elsewhere herein in relation to the invention.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

The invention will now be described, by way of example only, with reference to the accompanying drawings in which.

DETAILED DESCRIPTION OF THE PREFERRED EMBODIMENTS

Figure 1:
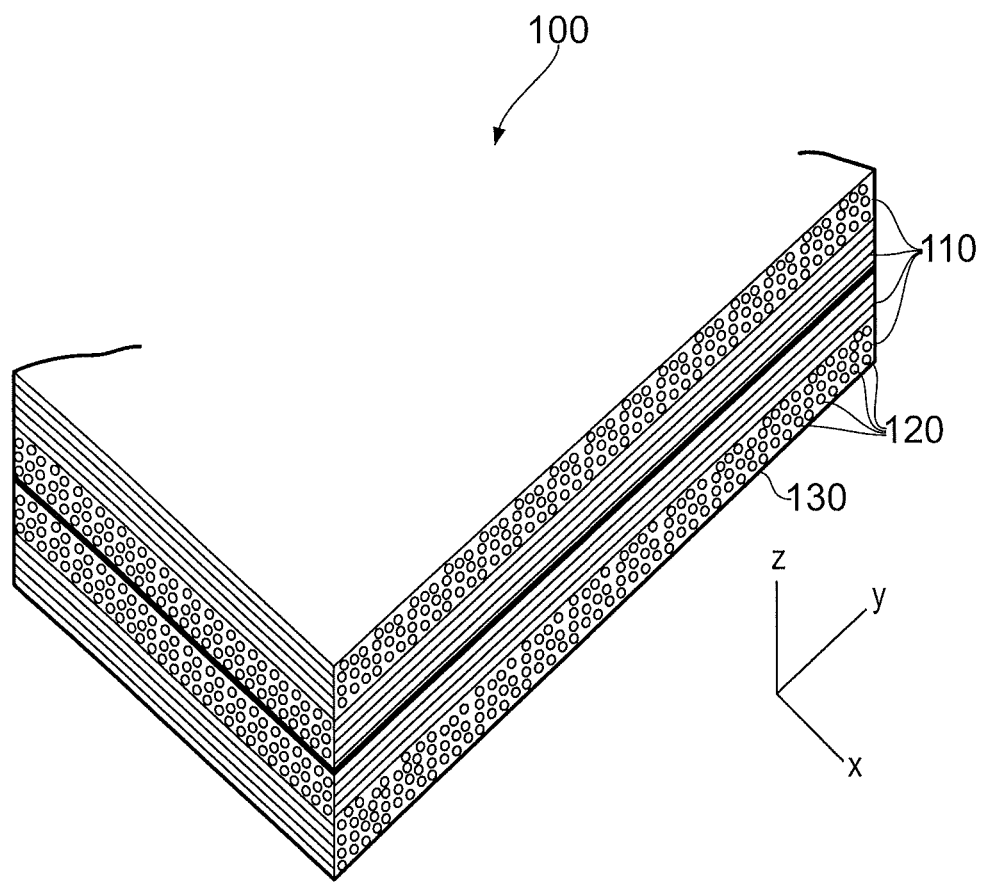
FIG. 1 shows a schematic, partial section view of a conventional composite material.

FIG. 1 shows an example of a laminated composite material 100 comprising a plurality of fibre layers 110. Each of the fibre layers 110 comprises a plurality of uni-directionally aligned fibres 120 held within a matrix material 130.

The matrix material 130 is cured so that the fibre layers 110 and the matrix material consolidate to form the solid composite material 100.

It can be seen in the example of FIG. 1 that alternate fibre layers 110 are laid up approximately perpendicular to one another. In alternative arrangements, the fibre layers 110 may comprise fibres having other orientations. The relative fibre orientation of each of the layers 110 together with the quantity of fibre layers 110 is determined by the design loads to which the finished component is to be subjected.

In FIG. 1 the fibre layers 110 of one orientation lie along the X direction while those of the alternate orientation lie along the Y direction. Were the composite material 100 of FIG. 1 to include through-thickness reinforcement then the reinforcing elements would be inserted in the Z direction. For this reason, through-thickness reinforcement may be referred to as z-pinning.

Figure 2A:
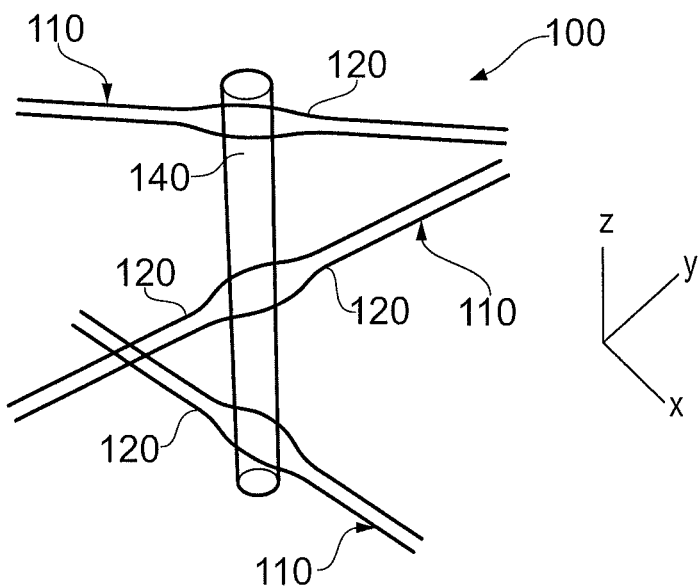
FIG. 2(a) shows a detailed perspective view of the composite material of FIG. 1.
Figure 2B:
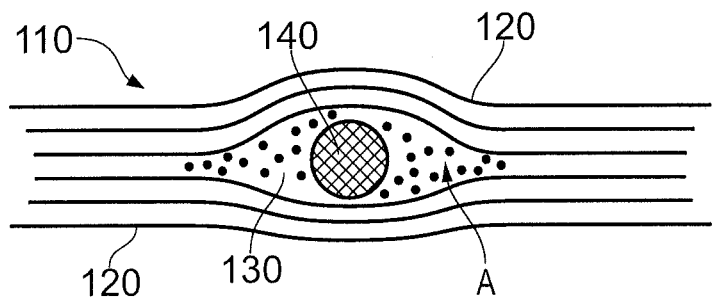
FIG. 2(b) shows a plan view of the composite material of FIG. 1.

FIGS. 2(a) and 2(b) illustrate the structure of the laminated composite material 100 where it has been through-thickness reinforced. FIG. 2(a) is a detailed perspective view of the composite material 100 showing the alternately oriented fibre layers 110. A reinforcing fibre 140 is inserted through the thickness of the cumulative fibre layers 110 in the Z direction. Generally, there will be a plurality of such reinforcing fibres 140. FIG. 2(a) illustrates how inserting the fibres 140 forces the aligned fibres 120 on each layer 110 apart to allow space for the reinforcing fibre 140.

FIG. 2(b) shows a plan view of the reinforcing fibre 140 within the composite material 100. In plan view it can be seen that forcing apart the fibres 120 on each layer 110 forms a region A, the volume of which is filled entirely with matrix material 130. It is in this region A that cracks are prone to form, which run perpendicular to the through-thickness direction of the reinforcing fibre 140.

Figure 3:
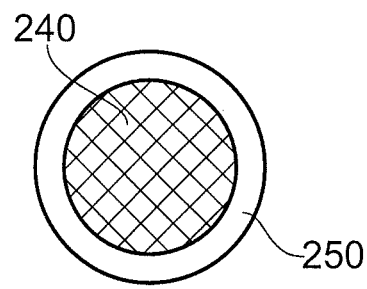
FIG. 3 illustrates a reinforcing element for use with the present invention.

The method of the present invention prevents these cracks forming in the region A of the layers. FIG. 3 shows the initial step of the process where a reinforcing element 240 is coated in a thermoplastic to form a thermoplastic layer 250. The thermoplastic layer 250 encases the reinforcing element 240 and mates with the remaining structure in which it is to be inserted. The ends of the reinforcing element 240 may also be coated in the thermoplastic layer 250.

The reinforcing element 240 is then inserted into a laid-up laminated thickness of fibre layers 210 to provide through-thickness reinforcement. As with the example described with respect to FIG. 2 above, each of the fibre layers 210 comprises a plurality of uni-directionally aligned fibres 220 held within a matrix material 230. The fibre layers 210 may be pre-impregnated with a matrix material 230. Alternatively, matrix material 230 may be provided in the uncured laminated structure independently of the fibres 220. The fibre layers 210 will have the appropriate orientation dependent upon the intended purpose of the final component to be manufactured. At this point in the process the matrix material 230 has not been cured or, as described below, not finished curing if the curing process has been triggered.

Once the reinforcing element 240 has been inserted into the laminated thickness of fibre layers, the matrix material 230 is cured. The curing process results in a consolidated composite material 200 including though-thickness reinforcement from the reinforcing element 240. It is likely that in order to be effective, a plurality of like reinforcing elements 240, which are coated with the thermoplastic layer 250, will need to be inserted into the laminated thickness of fibre layers 210 prior to curing of the matrix material 230.

Figure 4:
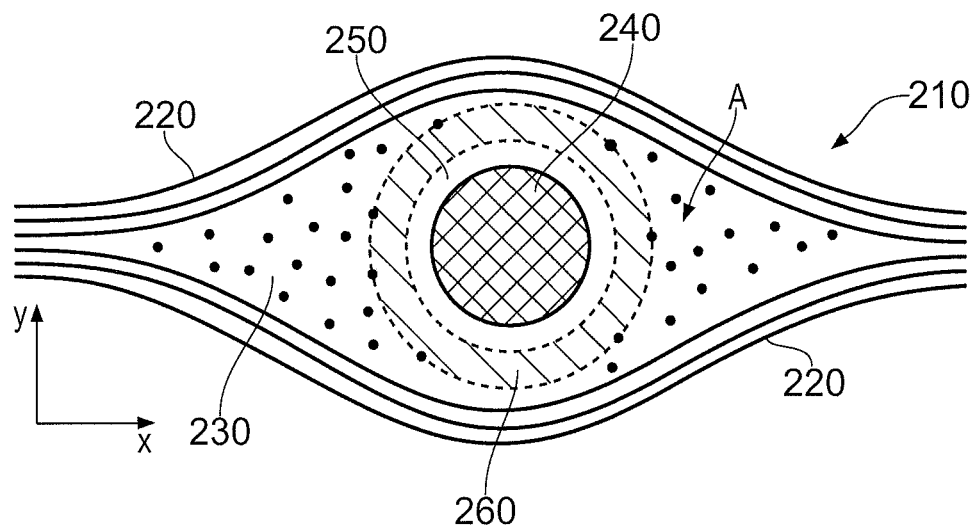
FIG. 4 is a section through a composite material manufactured according to the present invention.

FIG. 4 is a schematic section through the composite material 200 and viewed along the Z direction, which coincides with the lengthwise direction of the reinforcing element 240. In other words, the section view is perpendicular to the lengthwise direction of the reinforcing element 240. FIG. 4 shows one of the fibre layers 210 of the composite material 200 and accommodates the reinforcing element 240 between the aligned fibres 220. As with the example described above, the forced apart fibres 220 and reinforcing element 240 create a region A, the volume of which is occupied by the matrix material 230.

FIG. 4 illustrates that, as a result of the thermoplastic layer 250, the curing process forms a different structure from that which is described above with respect to FIGS. 2(a) and 2(b). Triggering the curing process by elevating the temperature of the matrix material 230 creates an interphase zone 260 between the thermoplastic layer 250 and the matrix material 230. The curing reaction with the epoxy itself may be exothermic, which may assist in the process. However, the prime mechanism by which the thermoplastic is brought close to its melting temperature (thereby forming the interphase zone) is the external heating.

The properties of the interphase zone 260 prevent cracks forming in the region A of the composite material 200. The interphase zone 260 is created during the curing process by diffusion between the two materials at the interface between matrix material 230 and the thermoplastic layer 250, which coats the reinforcing element 260. The interphase zone 260 or diffusion zone that is formed has compliant properties. Thus, the interphase zone 260 is a compliant zone in the composite material 200, which may absorb energy around the reinforcing element 250, thereby preventing shear forces causing cracking in the region A of the composite material 200.

Figure 5:
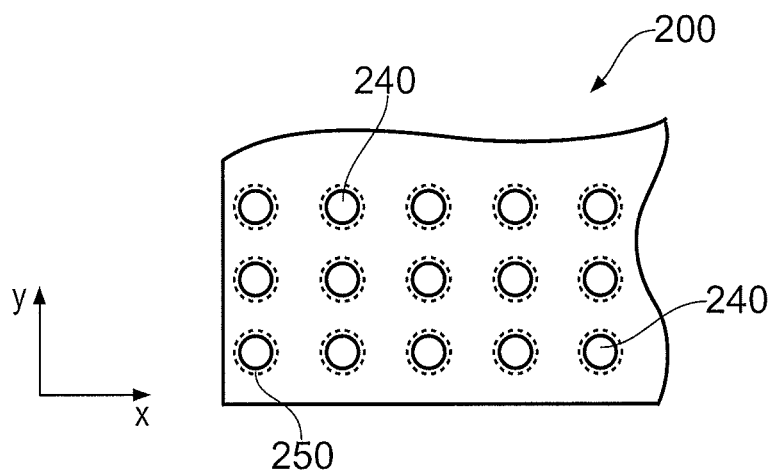
FIG. 5 illustrates a portion of a composite material manufactured according to the present invention.

As noted above, it is likely that a plurality of reinforcing elements 240 will be required. For example, 25,000 or more such reinforcing elements 240 may be required for some components manufactured from the composite material 200, although some components may require far fewer reinforcing elements 240 (for example tens, hundreds or thousands). FIG. 5 shows the composite material 200 with a regular pattern of reinforcing elements 240 providing through-thickness reinforcement. However, in certain applications it may be desirable to provide irregular patterns of reinforcing elements 240 in the composite material. Such a design may be preferable where the final component, which incorporates the composite material 200, is subjected to forces that are not uniform across the whole component.

The reinforcing element may consist of a single fibre or parallel sided cylinder to which the thermoplastic layer 250 is applied. Alternatively, the reinforcing element 240 may consist of a bundle of fibres coated with the thermoplastic layer 250. Coating the reinforcing element 240 in the thermoplastic layer 250 may be achieved by spraying the reinforcing element 240. Alternatively, the thermoplastic layer 250 may be applied by dipping the reinforcing element 240 in a bath of the appropriate liquid thermoplastic material. The reinforcing element 240 may be over moulded with the appropriate thermoplastic material.

The thermoplastic material which is used to coat the reinforcing fibre 240 may be chosen such that it is compatible with the matrix material 230. Such compatibility should ensure that diffusion occurs during curing of the matrix material 230 so that the interphase zone 260 forms as intended. It is expected that the most suitable matrix material 230 will be a polymeric matrix material. For example, an epoxy resin is particularly favoured as the polymeric matrix material.

For example, the thermoplastic may be chosen to match it to the matrix material in use for the composite in such a way that the glass transition temperature ($T_g$) of the thermoplastic is above the $T_g$ of the composite, and a melting temperature of the thermoplastic a little (−20° C.) above the cure temperature of the epoxy to encourage some diffusion between epoxy and thermoplastic but not complete dispersion. This may help to create the desired interphase (gradual change in properties) rather than an interface (step change in properties).

The reinforcing element 240 may be inserted by any known method into the laminated thickness of fibre layers 210. It may be preferable to provide a hole in the thickness of fibre layers 210 prior to inserting the reinforcing element 240. The hole could be formed by a needle for example. Irrespective of whether a hole is preformed in the thickness of fibre layers 210, it is expected that force will be required to insert the reinforcing element 240. This may be achieved, for example, by hammering the reinforcing element 240 to insert it. The hammering may be applied ultrasonically.

Because force is required to be exerted on the reinforcing element 240, the thermoplastic layer 250 may aid maintenance of the structural integrity of the reinforcing element 240 as it is inserted. The thermoplastic layer 250 may protect the reinforcing element from fracturing or splitting apart, particularly at its ends where the force of insertion is applied. Thus, as the thermoplastic layer 250 helps to prevent damage to the reinforcing element 240 as it is inserted, its effectiveness in providing through-thickness reinforcement is ensured.

The matrix material may be heated before inserting the reinforcing element 240. Typically, the temperature of the matrix material 230 would be kept below its gel temperature (ie to avoid the curing process being started) when a reinforcing element 240 is inserted. This will mean that the viscosity of the matrix material remains low, facilitating insertion of the reinforcing element 240. However, it is possible that the curing process may be at least initiated prior to the insertion of the reinforcing element 240.

As mentioned above, the matrix material 230 may be a polymeric material such as an epoxy resin. The matrix material 230 may be prepared with, or pre-impregnated with, each of the fibre layers 210 prior to the layers 210 being laid up to the laminated thickness. The use of a polymeric material may be beneficial because the required curing process may actually aid the insertion of the reinforcing element 240, as explained below.

Curing a polymeric material is triggered by heating the polymeric material to a pre-determined temperature. Therefore, the uncured laminated thickness of fibre layers 210 are heated to a pre-determined temperature. For example, the entire volume of the laminated fibre layers 210 may be heated by using an oven, or autoclave. Indeed, any suitable form of heating/curing may be used, including UV curing.

Heating the polymeric material the pre-determined temperature results in a determinable time-interval before the polymeric material reaches its gel point. The gel point is defined as the start of the cure reaction for the matrix material, i.e. the point at which the molecules of the matrix material begin linking together (or gelling) and the material starts to harden.

The pre-determined temperature and time-interval relationship will be unique to each matrix material 230 and is determined on the basis of the matrix material's curing parameters, rheology and gelation time.

Figure 6:
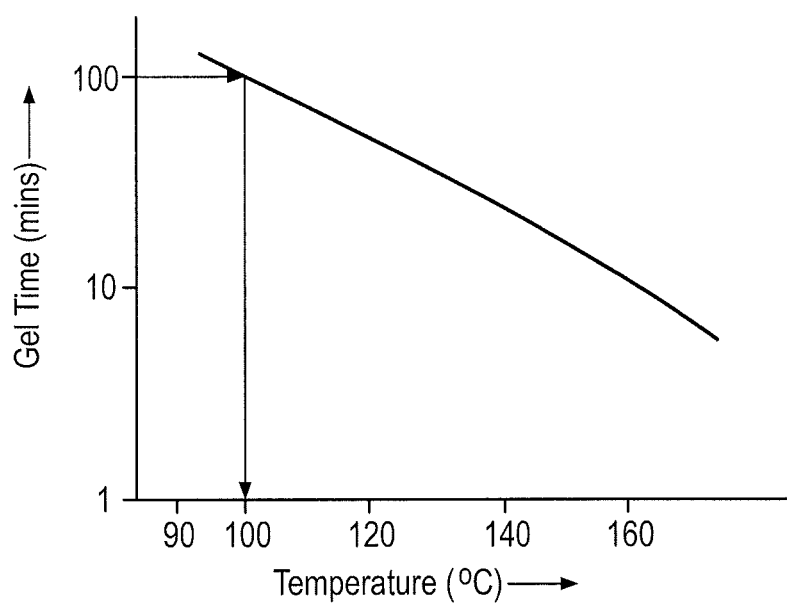
FIG. 6 shows a plot of gel time vs. temperature for a typical epoxy resin used with a laminated composite material.

FIG. 6 shows a Gel Time plot (gel time vs. temperature) for one suitable epoxy resin material which is typical of that which might be used in a laminated composite material. This data can readily be obtained from the matrix material supplier. The gel time plot indicates the time available at any particular temperature until the gel point of the material is reached.

Where curing is triggered prior to the insertion of the reinforcing element 240 (and it is emphasized that this may not be the case, i.e. the matrix material may be kept below the curing/gelling temperature prior to insertion of the reinforcing element), the time-interval is the time available to complete the insertion of reinforcing element 240 into the laminated thickness of fibre layers 210, and may be dependent on the geometry of the finished component and the quantity of reinforcing elements 240.

Where the method additionally involves forming holes to accept the insertion of the plurality of reinforcing elements 240 then the holes must also be formed in within the time period prior to the beginning of gelling of the matrix material 230, or the temperature must be kept below the gelling temperature prior to forming the holes.

Figure 7:
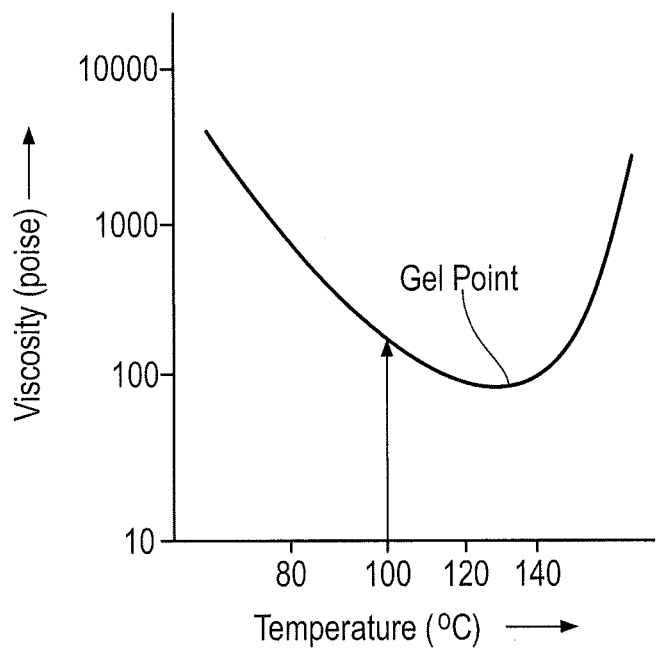
FIG. 7 shows a plot of dynamic viscosity vs. temperature for the epoxy resin of FIG. 6.

The applicability of a polymeric material to the method of manufacturing the composite material 200 is seen from FIG. 7, which shows a rheology plot (dynamic viscosity vs. temperature) for the epoxy resin material of FIG. 6. It can be seen from FIG. 7 that by heating the matrix material 230 (and the fibre layers 210) to the first pre-determined temperature (in this case, 100° C.) the dynamic viscosity of the epoxy resin matrix material 230 will be considerably lower than at room temperature. This reduction in viscosity greatly aids the process of inserting the reinforcing fibres. This enables the hole forming step, where carried out, and the insertion step to be carried out more easily and quickly since the matrix material is less viscous.

Referring to FIG. 6, by way of example, if a pre-determined time interval of 100 minutes is required to complete the reinforcing element 240 insertion process, it can be seen that the first pre-determined temperature will be 100° C. (or lower).

Once the first pre-determined temperature is reached, there is a finite time interval within which any holes must be formed and the corresponding reinforcing elements 240 must be inserted before the matrix material starts to cure. Once the actual curing of the matrix material 230 has started it is unlikely to be possible to form holes or insert reinforcing elements 240 without damaging the material.

The gel point is shown in FIG. 7 as the inflection point of the rheology plot, i.e. the point where the reduction in viscosity induced by heating ceases and further heating causes a rapid increase in viscosity as the material starts to cure or harden.

Figure 8:
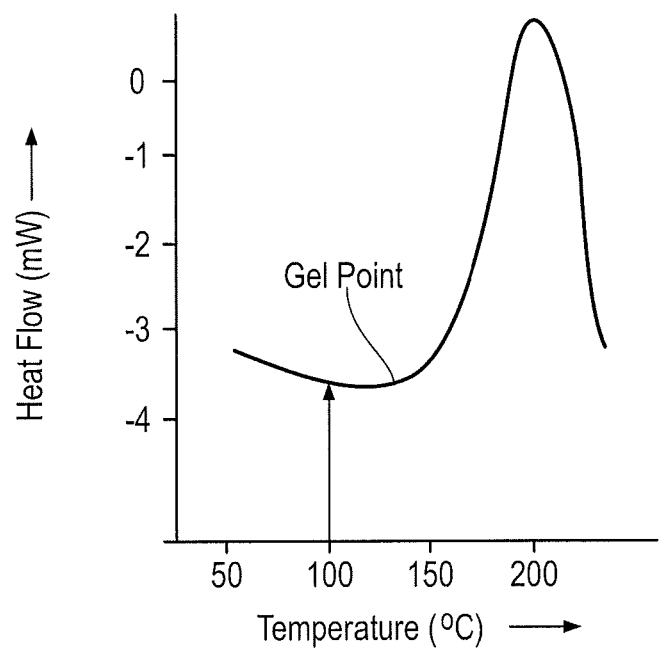
FIG. 8 shows a plot of heat flow vs. temperature for the epoxy resin of FIG. 6.

A further check on the suitability of the pre-determined temperature can be made from the Cure plot (heat flow vs. temperature) for the epoxy resin, as shown in FIG. 8. It can be seen from FIG. 8 that, for the present example, the first pre-determined temperature (100° C.) is below the temperature at which the resin begins to cure or harden, indicated by the peak in the curve. Thus, the matrix material is in a viscous state which greatly eases the insertion of the reinforcing fibres.

As mentioned above, the gel point corresponds to the start of the cure reaction in the resin. This point is indicated in FIG. 8 as the onset of the increase in heat flow with increasing temperature. The increase in heat flow shown in FIG. 8 above the gel point may assist in the diffusion process. The further heat generated as the matrix material 230 cures may assist the diffusion between the thermoplastic layer 250 and the matrix material 230 and therefore help to form the interphase zone 260. The thermoplastic may diffuse at temperature in the region of the gel point.

This method of through-thickness reinforcing a composite material is particularly applicable and useful in the manufacture of composite components for gas turbine engines. In particular, the method is applicable to the manufacture of fan blades for gas turbine engines where weight and strength of the blades is of particular design concern.

The present invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

I claim:

1. A method of manufacturing a through-thickness reinforced laminated material from a base material comprising fibre laminates, the method comprising the steps of:
   providing the base material with a matrix material;
   coating at least one reinforcing element in a thermoplastic layer comprised of a thermoplastic material;
   through-thickness reinforcing the base material by inserting the at least one reinforcing element through the thickness of the base material; and
   after the preceding steps have been performed, curing the through-thickness reinforced base material to form the through-thickness reinforced laminated material such that an interphase zone characterized by diffusion between the matrix material and the thermoplastic layer is formed between the thermoplastic layer and the matrix material.

2. A method according to claim 1, wherein the step of providing the base material with a matrix material is performed before inserting the at least one reinforcing element through the thickness of the base material, such that the at least one reinforcing element is inserted through the matrix material.

3. A method according to claim 1, wherein the step of providing the base material with a matrix material is performed after inserting the at least one reinforcing element through the thickness of the base material, such that the at least one reinforcing element is inserted into a dry fibre base material.

4. A method according to claim 1, wherein the step of coating the at least one reinforcing element in the thermoplastic layer comprises spraying the thermoplastic material onto the reinforcing element or submerging the at least one reinforcing element in a bath of the thermoplastic material.

5. A method according to claim 1, wherein the step of coating the at least one reinforcing element in the thermoplastic layer comprises over moulding the at least one reinforcing element in the thermoplastic material.

6. A method according to claim 1 wherein the step of through-thickness reinforcing the base material includes forming at least one hole through the thickness of the base material and then inserting the at least one reinforcing element into the at least one hole through the thickness of the base material.

7. A method according to claim 6 wherein the at least one hole is formed by a needle inserted into the thickness of the base material.

8. A method according to claim 1 where the step of through-thickness reinforcing the base material includes inserting a plurality of reinforcing elements each of which is coated with a corresponding thermoplastic layer such that during the step of curing each thermoplastic layer forms a corresponding interphase zone surrounding the corresponding reinforcing element.

9. A method according to claim 8 wherein the step of through-thickness reinforcing the base material includes forming a plurality of holes through the thickness of the base material and inserting each of the plurality of reinforcing elements coated with the thermoplastic layer into one of the plurality of holes through the thickness of the base material.

10. A method according to claim 1, wherein the base material with a matrix material is a composite material comprising fibers in the matrix material.

11. A method according to claim 10, wherein the matrix material is an epoxy resin and the thermoplastic material has a glass transition temperature above that of the composite material.

12. A method according to claim 1, wherein the the at least one reinforcing element is a pin.

* * * * *